No. 795,749. PATENTED JULY 25, 1905.
C. O. WYMAN.
HARVESTER AND BINDER.
APPLICATION FILED JAN. 22, 1904.
4 SHEETS—SHEET 1.
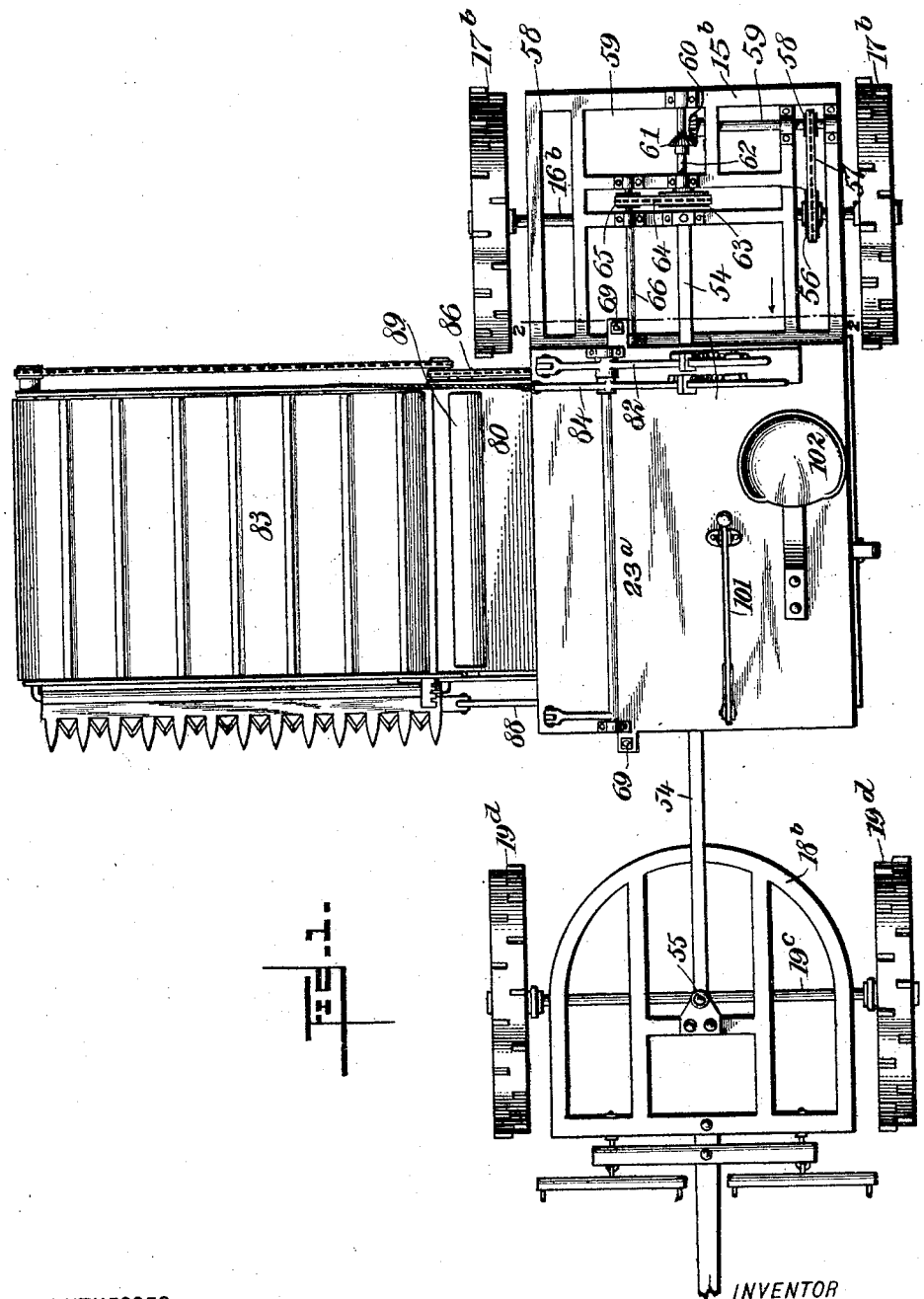
WITNESSES:
A. R. Appleman
Isaac B. Owens
INVENTOR
Charles O. Wyman
BY Munn & Co
ATTORNEYS No. 795,749. PATENTED JULY 25, 1905.
C. O. WYMAN.
HARVESTER AND BINDER.
APPLICATION FILED JAN. 22, 1904.
4 SHEETS—SHEET 2.
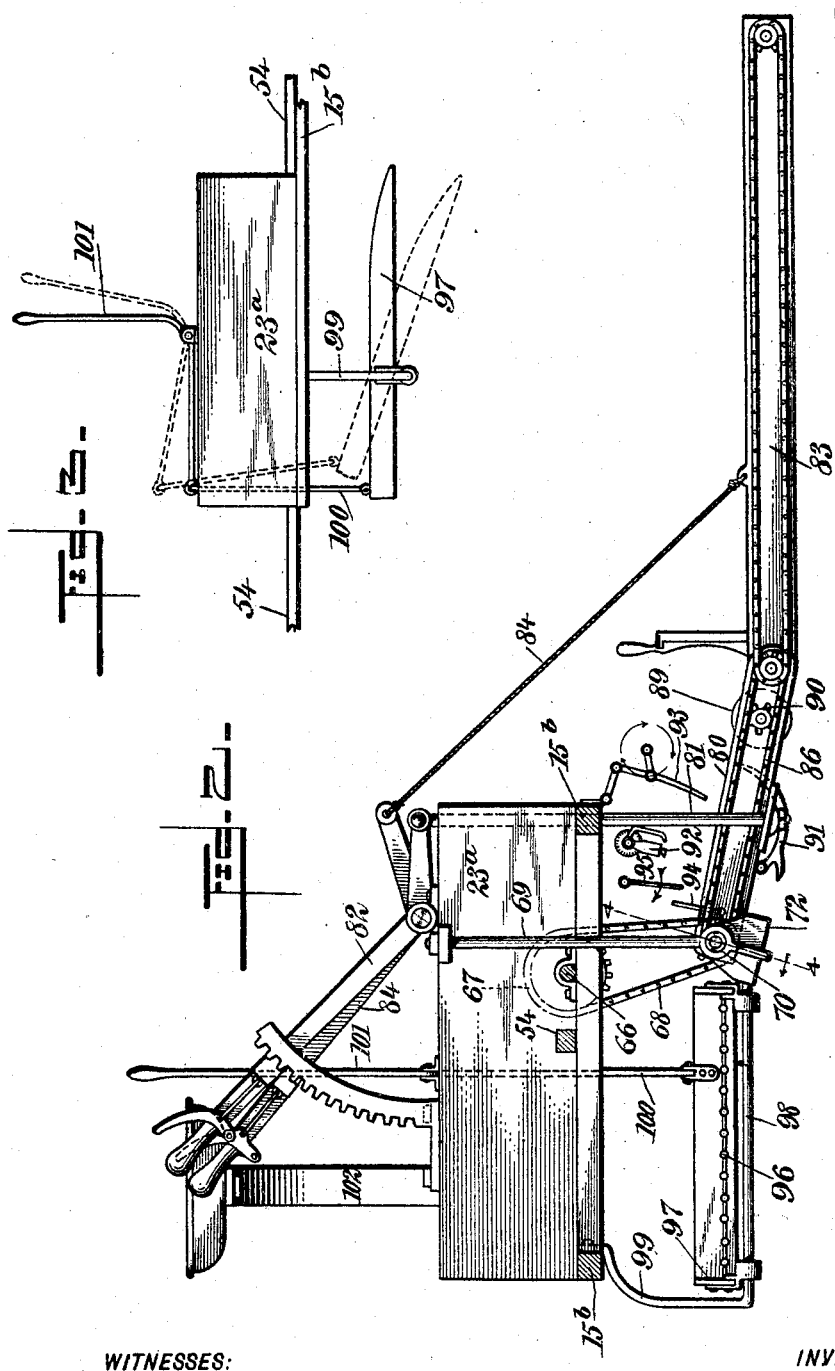
WITNESSES:
A. R. Appleman
Isaac B. Owens
INVENTOR
Charles O. Wyman
BY Munn & Co
ATTORNEYS

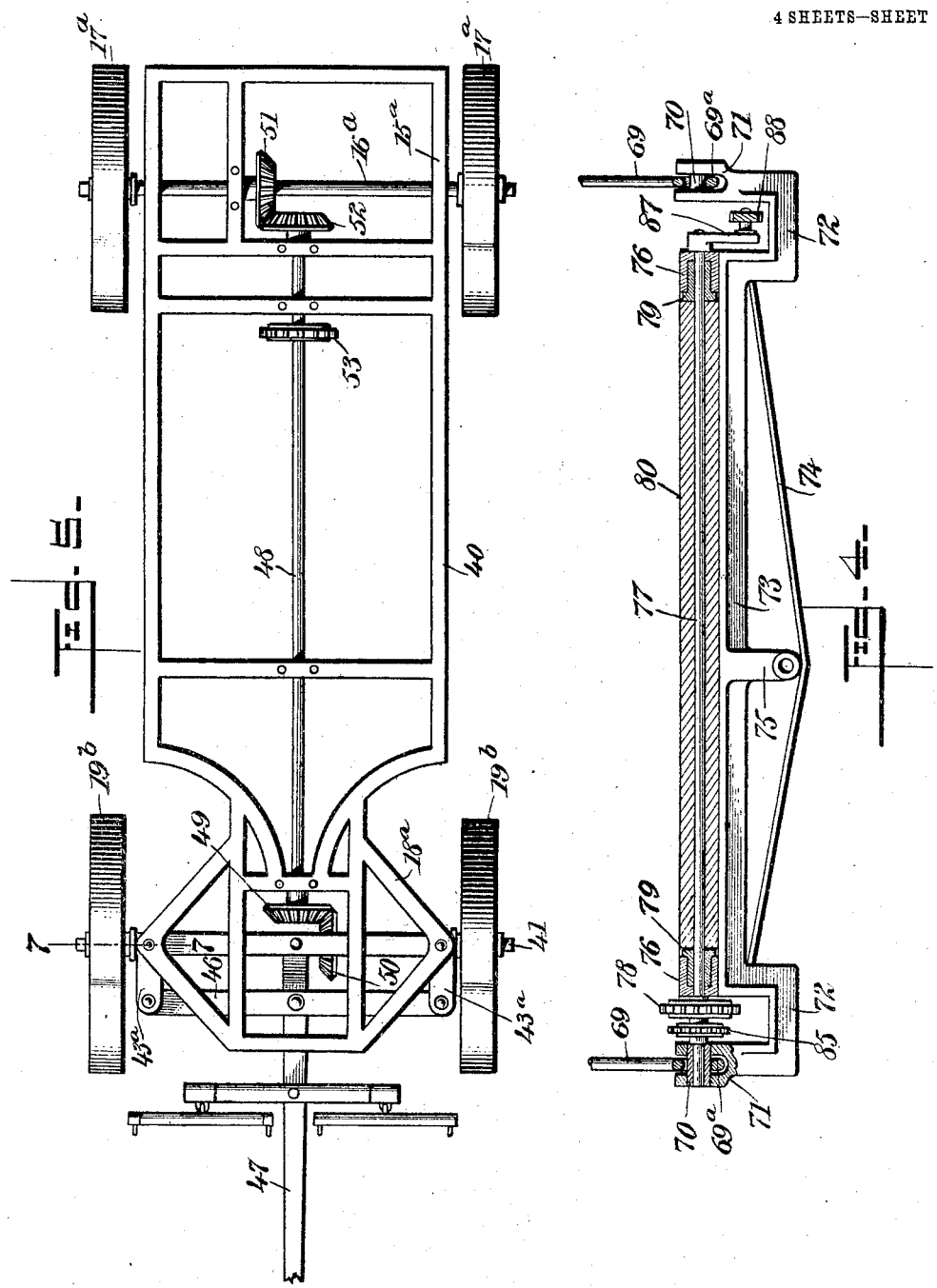

No. 795,749. PATENTED JULY 25, 1905.
C. O. WYMAN.
HARVESTER AND BINDER.
APPLICATION FILED JAN. 22, 1904.
4 SHEETS—SHEET 4.
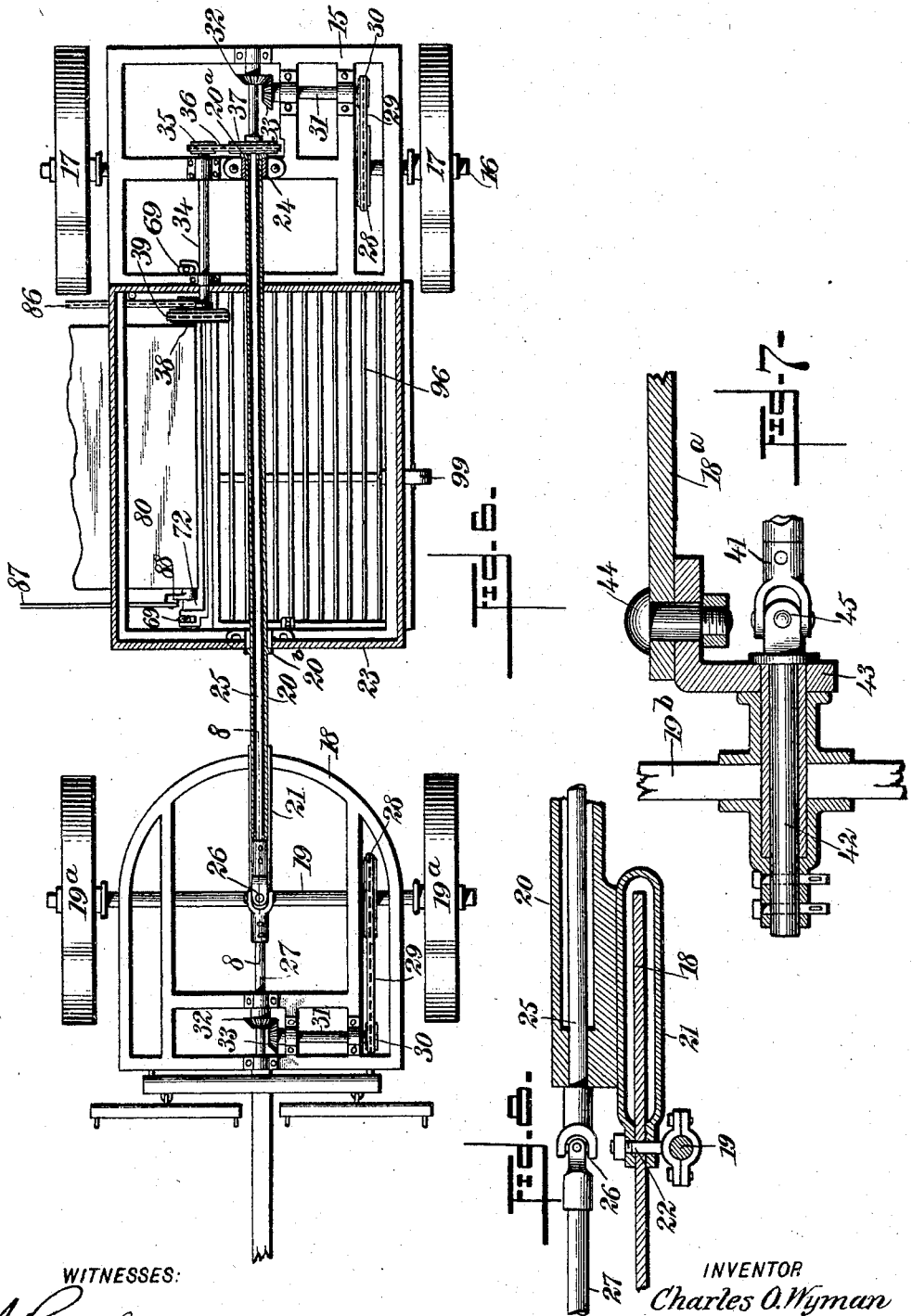
WITNESSES:
INVENTOR
Charles O. Wyman
BY
ATTORNEYS

UNITED STATES PATENT OFFICE.

CHARLES O. WYMAN, OF ANOKA, MINNESOTA.

HARVESTER AND BINDER.

No. 795,749.  Specification of Letters Patent.  Patented July 25, 1905.

Application filed January 22, 1904. Serial No. 190,155.

*To all whom it may concern:*

Be it known that I, CHARLES O. WYMAN, a citizen of the United States, and a resident of Anoka, in the County of Anoka and State of Minnesota, have invented a new and Improved Harvester and Binder, of which the following is a full, clear, and exact description.

The invention relates particularly to what are technically known as "low-down" binders, although many of its features may be advantageously applied to harvesters and binders of other types.

One of the principal objects of my invention is to so organize the frame and running-gear with respect to the harvesting and binding devices and the gearing for driving the same as to provide a more certain and stable base for the harvesting and binding mechanisms and a more efficient and effective drive than has heretofore been attained. This end I prefer to attain by providing the framing with four essentially uniform carrying-wheels and by connecting the driven parts with all four of these wheels, the power being applied from the wheels or their axles to a main driving-shaft running longitudinally of the machine, preferably through a hollow reach connecting the front and rear trucks, and the front axle turning in the usual manner around the axis of a king-bolt and the main driving-shaft having a universal joint therein coincident to the axis of the king-bolt, so that both sections of the shaft may rotate freely independently of the turning or sluing movement of the axle as above referred to.

A further important object of the invention is to dispense with the elevator usually employed in grain harvesters and binders, and in doing this I have devised a peculiar arrangement of that type in which the binder-deck and the binder mechanism are located directly adjacent to the cutting-platform, so that the grain passes from the platform onto the binder-deck, to be immediately acted upon by the binding mechanism. In connection with this organism I prefer to juxtapose to the stubbleward or discharge end of the deck a suitable means for receiving and discharging the sheaves, this means being preferably a bundle or sheaf carrier by which the sheaves are received and on which they may be accumulated and discharged at will.

The invention involves various other features of major or minor importance, and all will be fully set forth hereinafter.

This specification is an exact description of several examples of my invention, while the claims define the actual scope thereof.

Reference is to be had to the accompanying drawings, forming a part of this specification, in which similar characters of reference indicate corresponding parts in all the views.

Figure 1 is a plan view of my invention, showing the improved arrangement of the cutting-platform and binder-deck and illustrating one manner in which the harvesting and binding mechanism may be driven. Fig. 2 is a sectional elevation of the structure shown in Fig. 1, said view looking forward from the line 2 2 of Fig. 1. Fig. 3 is a fragmentary elevation of the stubbleward side of the machine, illustrating the box and the location and operation of the bundle-carrier with respect thereto. Fig. 4 is an enlarged detail section on the line 4 4 of Fig. 2. Fig. 5 is a plan view of the frame and running-gear, showing a modification by which the drive is taken from all four of the carrying-wheels. Fig. 6 is a sectional plan view of the invention, showing the preferred manner of driving the harvesting and binding parts—to wit, from four carrying-wheels transmitting to a main shaft having thereon a universal joint coincident to the king-bolt of the running-gear. Fig. 7 is a detail section on the line 7 7 of Fig. 5, and Fig. 8 is a detail section on the line 8 8 of Fig. 6.

Referring first to Figs. 6 and 8, 15 indicates the rear truck, which may be framed in any suitable manner and which carries the revoluble rear axle 16, to the ends of which the rear wheels 17 are secured, so that as the machine is drawn over the ground the rear axle is rotated. 18 indicates the front truck, which also may be framed in any suitable manner and in which the front axle 19 is mounted to revolve, this axle having the front wheels 19$^a$ fastened thereto, so as to turn the front axle upon the movement of the harvesting apparatus. The front and rear trucks are connected together by a hollow single or pole reach 20, fastened rigidly to the rear truck and carrying at its front end a rigidly-connected yoke 21, in which the king-bolt 22 is arranged to turn freely, thus allowing the front truck 18 and the axle 19 to turn or slue in order to turn the harvesting apparatus without interfering with the security of the connection between the front truck and the hollow reach. The hollow reach is therefore a rigid element, and to the hollow reach, and preferably to the rear truck as well, is securely joined the box or intermediate frame-section 23, which serves directly to mount the various parts of the harvesting and binding mechanism, as will be set forth hereinafter. The rear end of the hollow reach may be connected to the rear truck in any suitable manner. I prefer, however, to employ one or more boxes or collars 24, fastened to the rear truck and having the hollow reach fastened therein, said reach having at its rear extremity a flange $20^a$, engaging the rear box 24 to resist the tendency of the hollow reach to draw out of the boxes. A similar collar $20^b$ bears against the front of the frame-section 23 to resist the rearward thrust of the reach. Suitably mounted within the hollow reach is the rear section 25 of the revolubly-mounted driving-shaft. Said section 25 extends beyond each end of the hollow reach and its forward end terminates over the king-bolt 22, where it is provided with a universal joint 26, connecting it with the front section 27 of the main shaft. This front section 27 is mounted on the front truck, as shown. Now it will be apparent that as the front truck swings in order to turn the harvester the front section 27 of the main shaft will move with the front truck; but owing to the location of the universal joint 26 coincident to the axis of the king-bolt the front section of the main shaft may move freely with the front truck without interfering with the turning movement of the main shaft. I connect the front section of the main shaft with the front wheels or axle and the rear section of the main shaft with the rear wheels or axle, so that said main shaft will be revolubly driven from all four wheels of the apparatus without interference by the turning movement of the front truck. The gearing for so connecting the main shaft may be of any desired sort. I prefer, however, to attach to the front and rear axles sprocket-wheels 28, over which run chains 29 to sprocket-wheels 30, fastened on transverse counter-shafts 31, revolubly mounted on the respective trucks and connected by miter gears 32 and 33 with the respective sections of the main shaft. I also provide gearing for transmitting from the main shaft that movement which is necessary to drive the various operative parts of the harvester and binder. This gearing also may be of various embodiment; but I prefer to mount on the main truck a longitudinally-extending revoluble counter-shaft 34, the rear end of which is provided with a sprocket-wheel 35, over which runs a chain 36 to a sprocket-wheel 37, fastened on the rear section of the main shaft. At its front end the shaft 34 carries a sprocket-wheel 38, over which a chain 39 runs to the harvesting and binding mechanism, as will be fully set forth hereinafter.

Fig. 5 shows another manner in which the power may be taken from all of the four carrying-wheels. In this form of the invention the rear truck $15^a$ and the front truck $18^a$ are connected by a frame or rigid section 40 in place of the hollow reach before described. The rear axle $16^a$ is mounted to turn in the rear truck and the front axle 41 also turns in its corresponding truck. As shown in Fig. 7, however, the front carrying-wheels $19^b$ are mounted on short spindles 42, which are arranged to turn freely in brackets 43, depending from the front truck $18^a$ and attached thereto by a pin 44, constituting a vertically-disposed pivot around the center of which the brackets 43 may freely swing. The spindles 42 have universal joints 45, connecting them, respectively, with the front axle 41, and the brackets 43 have forward extensions $43^a$, joined together by a transverse connecting-bar 46, to which the pole 47 of the harvester is joined essentially the same as in the structure disclosed in my copending application for harvester, Serial No. 163,872, filed July 1, 1903. 48 indicates the main driving-shaft, which is revolubly mounted in the front and rear trucks, as shown, and is connected to the front axle 41 by means of bevel-gears 49 and 50 and to the rear axle $16^a$ by means of bevel-gears 51 and 52. In connection with this organism it will be observed that the front wheels $19^b$ slue or oscillate around the pole 47 to turn the harvester, but that they transmit their rotating movement to the front axle 41 irrespective of the sluing of the wheels $19^b$, and that this axle as well as the axle $16^a$ transmits its movement to the main shaft 48. 53 indicates any suitable element for transmitting to the harvesting and binding mechanism the movement of the shaft 48. While I have shown a shaft 48 and bevel-gears 49, 50, 51, and 52 in Fig. 5, it is clear that the same end may be attained by employing sprocket-wheels and chains and indeed various other forms of gearing.

The frame and running-gear shown in Figs. 1 and 2 provide for driving the harvesting and binding mechanism from the rear wheels only. In said views $15^b$ indicates the rear truck, which may be framed in any suitable manner and carries revolubly the rear axle $16^b$, on which the rear wheels $17^b$ are fixed. The front truck $18^b$ has its front axle $19^c$ mounted therein in any desired manner, either revolubly or fixedly, and carrying suitably the front wheels $19^d$. 54 indicates a single or pole reach connecting the two trucks, this reach being fastened securely to the rear truck and being joined by a pivot 55 to the front truck. $23^a$ indicates the box or intermediate frame-section, which is securely joined to the reach 54 and to the rear truck $15^b$. The driving movement is obtained from the rear axle $16^b$ by means of a sprocket-wheel 56, fastened thereon and carrying a chain 57, running over a sprocket-wheel 58 on a transversely-located shaft 59, revolubly carried in the rear truck. The shaft 59 is connected by bevel-gears 60 and 61 to the longitudinally-extending drive-shaft 62, which is revolubly mounted in the rear truck and has a sprocket-wheel 63, over which runs a chain 64 to a sprocket-wheel 65 on the longitudinally-extending main drive-shaft 66. Said shaft projects forward to the intermediate frame-section 23ª and carries a sprocket-wheel 67, over which runs a chain 68 to the harvesting and binding mechanism. Carried, respectively, at the front and rear of the intermediate main section 23ª are supporting-rods 69, which project downward below the main section and, as best shown in Fig. 4, have eyes 69ª at their lower ends receiving loosely thimbles 70, carried in the forked ends 71 of a longitudinally-extending hanger. This hanger has dropped end portions 72, connected by a main part 73 and braced, if desired, by a truss-rod 74, attached, respectively, to the dropped ends 72 and bearing against a bracket 75, depending from the main part 73. It will be observed, therefore, that the hanger is supported from the rods 69 in such a manner that the hanger may swing thereon around the longitudinal axis of the machine. Mounted in boxes 76, carried by the hanger, and in the rear thimble 70 is a revoluble shaft 77, carrying fixedly a sprocket-wheel 78, over which runs a chain 68. In this manner this shaft 77, running coincident to the axis of the swinging movement of the hanger, maintains its axial position independently of the swinging of the hanger and may therefore be uniformly driven from the chain 68. Arranged to turn within the boxes 76 are the trunnions 79 of the binder-deck 80. Said deck is therefore mounted to swing around the axis of the shaft 77, and it is adjustably sustained by means of supporting-rods 81, depending from the intermediate frame-section 23ª. 82 indicates a lever for raising or lowering the rods 81, and consequently the deck 80. At their upper ends the rods 81 are provided with a suitable means for raising and holding them at the desired adjustment. This means may be any desired—for instance, that disclosed in connection with the elevator in my copending application, above referred to. The binder-deck carries at its grainward end the cutting-platform and its appurtenances 83. These parts also may be of any desired embodiment, an example of which may be seen in my copending application, above referred to, the cutting-platform being mounted to swing on the binder-deck and having a suitable mechanism 84 for adjustably holding it. Attached to the shaft 77 is a sprocket-wheel 85, over which runs a chain 86 to drive the platform-canvas, and at the other end of the shaft 77 a crank 87 is attached, this crank being connected with the pitman 88 of the cutting apparatus. I have not illustrated nor will I describe any specific form of reel in connection with my invention, since the reel is in no way a part of the present invention. Any suitable form of reel may be employed, an example of which may be seen in my copending application, above referred to. The grain falls on the platform-canvas and is advanced stubbleward thereby in the usual manner. As it approaches the grainward end of the binder-deck it will pile thereon. Suitable means are provided for clearing the stubbleward end of the platform-canvas and for starting the movement of the grain on the binder-deck. As here shown, I provide a roller 89, running longitudinally of the machine and suitably set in the binder-deck near the grainward end thereof. On the shaft of this roller a sprocket-wheel 90 is attached, and this is engaged by the chain 86, so as to impart a rotating movement to the roller in such direction that the upper surface of the roller travels stubbleward, and in this way the grain is cleared from the discharge end of the platform-canvas and started in its movement over the binder-deck. I arrange over the binder-deck a mechanism for packing the grain to form the gavel and for binding the same into a sheaf. The specific character of this mechanism forms no part of the present invention, and any of the known mechanisms for this purpose may be employed. In Fig. 2 I have indicated diagrammatically the positions of the main elements. The needle 91 is located under the binder-deck and moves through a suitable opening therein, so as to pass around the grainward side of the gavel and carry the twine to the knotter 92. 93 indicates the packer mechanism which lies over the binder-deck and crowds the grain toward the knotter, and 94 and 95 may be taken, respectively, to represent the trip-arm and the discharge or ejecting device. The commercial binding and knotting mechanism of the Walter A. Wood Mowing & Reaping Co. may be well applied in the manner above outlined. The grain passes onto the binder-deck and the sheaf is formed thereon, after which it is thrown by the ejector 95 onto the bundle or sheaf carrier, which will now be described. The bundle-carrier is preferably constructed with a number of slats or tines 96, disposed longitudinally of the machine and located at the stubbleward end of the binder-deck under the intermediate frame-section 23ª. These slats or tines are carried by a frame 97, having front end and side walls, but open at the rear to permit the easy discharge of the sheaf. Said bundle-carrier is mounted to rock around a transversely-disposed shaft 98, passing under the bundle-carrier and sustained by a bracket 99, depending from the intermediate frame-section 23ª. A suitable means is provided for holding the bundle-carrier in horizontal or active position and for dumping the same at will or swinging it around the shaft 98, as indicated by the broken lines in Fig. 3. This mechanism may comprise a rod 100, extending upward through the intermediate frame-section 23ª, and, if desired, connected with an elbow-lever 101, which is in convenient reach of the operator. Mounted on the intermediate frame-section 23ª is the driver's seat 102, and by reference to Fig. 1 it will be observed that not only the lever 101, but the devices 82 and 84, are within convenient reach of the driver, who thereby has the machine completely under control. The sheaves may be allowed to accumulate in the bundle-carrier until sufficient have been accumulated to form a shock, whereupon the bundle-carrier may be tilted to dump the sheaves, which will then fall under the machine and are left behind the same.

The operation of the apparatus will be understood by persons skilled in the art. As the machine is driven through the field the grain is cut and falls on the platform-apron, by which it is carried stubbleward to the binder-deck. Through the action of the devices 89 and 93 the grain is advanced along the binder-deck and the gavel is formed. By mechanism properly actuated from the trip-arm 94 the needle and knotter devices will be set in operation and the sheaf thereby formed. The ejector 95, properly driven in time with the binding devices, will throw the sheaf into the bundle-carrier, and from here it may be dumped at will. The frame and binding devices being relatively low avoid the use of an elevator and the consequent expenditure of power and machinery incident thereto, thus making the apparatus much more simple in construction and more easily driven than the usual types of upright or high binders. Also the low frame, with its approximately uniform carrying-wheels, constitutes a stable and secure mount for the operative parts, and by means of the peculiar driving mechanism I am enabled to apply to the harvesting and binding mechanism the full traction power of all of the wheels. This drives the apparatus uniformly and is not subject to fluctuations in the driving power due to the unevenness of the ground or to other conditions which are incident to the usual single-traction-wheel construction.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A harvester, having an axle with wheels thereon, the axle and wheels being arranged to slue to turn the harvester, and a power-transmitting shaft connected with the harvesting devices to drive the same, and having a joint therein coincident to the axis of the said turning movement of the wheels and axle.

2. A harvester, having front and rear axles and wheels thereon, one axle being capable of turning or sluing to turn the harvester, and a power-transmitting shaft connected with the harvesting mechanism and driven from both axles and having therein a joint coincident to the axis of the said turning or sluing movement.

3. A harvester, having two carrying-wheels, one of which is arranged to turn or slue to turn the harvester, a shaft having two sections connected by a universal joint, said joint lying coincident to the axis of the said turning or sluing movement and the shaft having connection with the harvesting devices to drive the same, gearing connecting one section of the shaft with one wheel, and gearing connecting the other section of the shaft with the other wheel.

4. A harvester, having two axles each with two wheels thereon, one axle and its wheels being arranged to turn or slue around an axis disposed medially of the axle, whereby to turn the harvester, a shaft in two sections connected by a universal joint, said joint lying coincident to the axis of the said turning or sluing movement of the axle, and the shaft having connection with the harvesting devices to drive the same, gearing connecting one shaft-section with one axle, and gearing connecting the other shaft-section with the other axle.

5. A harvester having a frame comprising a hollow reach, two carrying-wheels for the frame, one of said wheels being arranged to turn or slue independently of the reach, to turn the harvester, a shaft extending through the hollow reach and having a joint therein lying coincident to the axis of the said turning or sluing movement, the shaft having connection with the harvesting mechanism, to drive the same, and gearing connecting the shaft-sections respectively with the wheels.

6. A harvester, comprising a rear truck, a front truck, a hollow reach joining the trucks and having pivotal connection with the king-bolt of the front truck, wheels and axles for the truck, a driving-shaft extending through the hollow reach and having a joint therein coincident to the axis of said king-bolt, means for driving the sections of the shaft respectively from the front and rear axles, and gearing extending from the shaft to drive the harvesting devices.

7. A harvester, comprising a frame having a hollow reach, a shaft extending through the reach, and means for transmitting movement to the shaft and from the shaft to the harvesting devices.

8. A harvester, comprising a frame having a hollow reach, a shaft extending through the same, means for driving the shaft, a counter-shaft mounted on the frame outside of the hollow reach, gearing connecting the counter-shaft with the first-named shaft, and gearing connecting the counter-shaft with the harvesting devices.

9. A harvester, comprising front and rear trucks, wheels and axles respectively therefor, a hollow reach connecting the trucks, said reach having pivotal connection with the king-bolt of the front truck, a shaft extending through the hollow reach and having a joint therein coincident to the axis of the king-bolt, means for driving the sections of the shaft respectively from the front and rear wheels, a counter-shaft located outside of the hollow reach, gearing connecting the counter-shaft with the first-named shaft, and gearing connecting the counter-shaft with the harvesting devices.

10. A harvester, comprising a rear truck, a wheel therefor, a front truck, a wheel therefor, a hollow reach attached to the rear truck, a yoke attached to the forward portion of the hollow reach and pivoted to the king-bolt of the front truck, a shaft extending through the hollow reach and having a joint therein coincident to the axis of the king-bolt, means for driving the sections of the shaft respectively from the front and rear wheels, and means connecting the shaft with the harvesting devices, to drive the same.

11. A harvester, comprising front and rear trucks, wheels therefor, a single or pole reach connecting the trucks, an intermediate frame-section connected to the reach and to the rear truck, and harvesting devices.

12. A harvester, comprising front and rear trucks, wheels therefor, a single or pole reach connecting the trucks, an intermediate frame-section connected to the reach and to the rear truck, and harvesting devices, the said harvesting devices being suspended from the intermediate frame-section.

13. A harvester, comprising front and rear trucks, wheels therefor, a hollow reach connected to the rear truck and pivoted to the king-bolt of the front truck, an intermediate frame-section connected to the reach and to the rear truck, harvesting devices hung therefrom, a shaft extending through the hollow reach and having a joint therein coincident to the axis of said king-bolt, means for driving the sections of the shaft respectively from the front and rear wheels, and means for driving the harvesting mechanism from the shaft.

14. A harvester, comprising front and rear trucks, wheels therefor, a hollow reach connected to the rear truck and pivoted to the king-bolt of the front truck, an intermediate frame-section, harvesting devices hung therefrom, a shaft extending through the hollow reach and having a joint therein coincident to the axis of said king-bolt, means for driving the sections of the shaft respectively from the front and rear wheels, and means for driving the harvesting mechanism from the shaft, said means for driving the harvesting mechanism comprising a counter-shaft, gearing connecting it with the first-named shaft, and gearing connecting the counter-shaft with the harvesting devices.

15. A harvester and binder, comprising the combination with a binder-deck, of means for pivotally mounting the stubbleward end thereof, a platform and a cutting apparatus carried on the grainward end of the deck, whereby the binder-deck receives the grain directly from the platform, a binding mechanism located at the binder-deck, and means for driving the cutting apparatus and binder mechanism in unison.

16. A harvester and binder, having a binder-deck, means at the stubbleward end thereof whereby to mount the deck to swing, a platform and cutting apparatus pivotally mounted on the grainward end of the binder-deck, means for adjustably holding the platform and cutting apparatus, binding mechanism located at the binder-deck, and means for driving the operative parts.

17. A harvester, comprising the combination with a frame, of a hanger extending longitudinally thereof and mounted to swing thereon around an axis longitudinally of the hanger, a platform and cutting apparatus, and means connecting the platform and cutting apparatus with the hanger, said means being mounted to swing around an axis coincident to that of the swinging movement of the hanger.

18. A harvester and binder, comprising the combination with a frame, of a hanger arranged to swing around an axis longitudinally of the frame, a binder-deck mounted in the hanger to swing around an axis coincident to the axis of the swinging movement thereof, a binder mechanism located at the binder-deck, a platform, attached to the grainward end of the binder-deck and discharging the grain directly thereon, a cutting apparatus and gearing for driving the operative parts.

19. A harvester and binder, comprising the combination with a frame, of a hanger arranged to swing around an axis longitudinally of the frame, a binder-deck mounted in the hanger to swing around an axis coincident to the axis of the swinging movement thereof, a binder mechanism located at the binder-deck, a platform, attached to the grainward end of the binder-deck and discharging the grain directly thereon, a cutting apparatus gearing for driving the operative parts, and means for vertically adjusting the binder-deck around the axis of the said swinging movement thereof.

20. A harvester and binder, comprising the combination of a frame, a hanger mounted thereon to swing around an axis longitudinally of the frame, a binder-deck arranged to swing around an axis coincident to that of the swinging movement of the hanger, means for adjustably holding the binder-deck, a binder mechanism located at the binder-deck, a platform and cutting apparatus pivotally mounted on the free end of the binder-deck, and means for adjustably holding the platform and cutting apparatus.

21. In a harvester and binder, the combination with a frame, of a shaft mounted therein, means for driving the shaft, a binder-deck arranged to swing around the axis of the shaft, means for adjustably holding the binder-deck, a binder mechanism located at the binder-deck, a platform and cutting apparatus mounted at the free end of the binder-deck, gearing extending from the shaft to drive the platform-apron, and gearing extending from the shaft to drive the cutting apparatus.

22. In a harvester and binder, the combination with a frame, of a shaft mounted therein, means for driving the shaft, a binder-deck arranged to swing around the axis of the shaft, means for adjustably holding the binder-deck, a binder mechanism located at the binder-deck, a platform and cutting apparatus mounted at the free end of the binder-deck, gearing extending from the shaft to drive the platform-apron, gearing extending from the shaft to drive the cutting apparatus, the said platform and cutting apparatus being pivotally mounted on the binder-deck, and means for adjustably holding the platform.

23. A harvester and binder, comprising the combination with a frame, of a revoluble shaft, means for driving the same, a binder-deck arranged to swing around the axis of the shaft, a platform and cutting apparatus mounted on the binder-deck, means for adjustably holding the binder-deck, binding mechanism located at the binder-deck, a sprocket-wheel attached to the shaft, a chain connected with the wheel and adapted to transmit the driving movement to the platform-canvas, a crank attached to the said shaft, and a pitman connecting the crank with the cutting apparatus.

24. In a harvester, the combination with a frame, of supporting-rods carried thereon, a hanger sustained by said rods, the hanger swinging on an axis longitudinally of the machine, a shaft mounted in the hanger coincident to the axis of the swinging movement thereof, a binder-deck arranged to swing around the axis of the shaft, means for adjustably holding the binder-deck, a platform and cutting apparatus carried by the grainward end of the binder-deck, a gear attached to the shaft, means connected with the gear for driving the same and the shaft, gearing extending from the shaft to operate the platform canvas or apron, and gearing extending from the shaft to operate the cutting apparatus.

25. A harvester and binder comprising the combination with a frame, of a binder-deck adjustably mounted thereon, means for adjusting the binder-deck, a binding mechanism, a platform and cutting apparatus mounted to swing on the grainward end of the binder-deck and sustained thereby, means for adjusting the platform and cutting apparatus, and gearing for driving the operative parts.

26. A harvester and binder, comprising a binder-deck, means for adjustably mounting the same at its stubbleward end, a binding mechanism juxtaposed to the binder-deck, a platform and cutting apparatus adjustably mounted on the grainward end of the binder-deck, and gearing for driving the binding mechanism and cutting apparatus in unison.

In testimony whereof I have signed my name to this specification in the presence of two subscribing witnesses.

CHARLES O. WYMAN.

Witnesses:
LEAH G. CHOUINARD,
WILL. A. BLANCHARD.